United States Patent

Kim

[11] Patent Number: 6,052,389
[45] Date of Patent: Apr. 18, 2000

[54] PER-SESSION PRE-SYNCHRONIZED FRAMING METHOD FOR REAL-TIME SERVICES IN ATM NETWORKS

[75] Inventor: Deog-Nyoun Kim, Seoul, Rep. of Korea

[73] Assignee: Daewoo Electronics Co., Ltd., Rep. of Korea

[21] Appl. No.: 08/958,284

[22] Filed: Oct. 27, 1997

[30] Foreign Application Priority Data

Oct. 29, 1996 [KR] Rep. of Korea ............ 96-49692
Nov. 29, 1996 [KR] Rep. of Korea ............ 96-60083
Nov. 29, 1996 [KR] Rep. of Korea ............ 96-60084
Nov. 29, 1996 [KR] Rep. of Korea ............ 96-60087

[51] Int. Cl.$^7$ .................................................. F04B 7/04
[52] U.S. Cl. ............................................. 370/516; 370/519
[58] Field of Search ............................. 370/236, 252, 370/458, 503, 395, 516, 517, 519, 371, 400, 230, 507, 508, 394; 375/371, 372

[56] References Cited

U.S. PATENT DOCUMENTS 5,043,982  8/1991  Werner .................... 370/519
5,648,970  7/1997  Kapoor .
5,933,414  8/1999  Georgiadis et al. ............ 370/252

FOREIGN PATENT DOCUMENTS

2293720  4/1996  United Kingdom .
2316270  2/1998  United Kingdom .

Primary Examiner—Tesfaldet Bocure
Assistant Examiner—Brenda H. Pham
Attorney, Agent, or Firm—Anderson Kill & Olick

[57] ABSTRACT

A method for transmitting jitter information in a network, wherein a connection for a call is established from a source node to a destination node through a plurality of nodes and a frame counter is located at each of the nodes, detects propagation delays and corresponding mismatch delays between neighboring node pairs, delay bounds at each of the nodes, and a frame size of the connection, wherein each neighboring node pair includes an upstream node positioned toward the source node and a downstream node positioned toward the destination node and the corresponding mismatch delay results from the mismatch in time slot boundaries between an upstream node and a downstream node. Then the frame counters are synchronized and activated, based on the propagation delays and the corresponding mismatch delays between the neighboring node pairs, the delay bounds at a corresponding node, and the frame size of the connection, and a cell is serviced from the source node to the destination node through each node based on the value of the corresponding frame counter.

15 Claims, 8 Drawing Sheets

PER-SESSION PRE-SYNCHRONIZED FRAMING METHOD FOR REAL-TIME SERVICES IN ATM NETWORKS

FIELD OF THE INVENTION

The present invention relates to a method for scheduling cells in an ATM network by employing per-session frames; and, more particularly, to a-method capable of finding out jitter information to thereby control jitter without transmitting the jitter information from one node to another.

DESCRIPTION OF THE PRIOR ART

B-ISDN(broadband integrated service digital network) is a digital network which provides various kinds of services, such as continuous real-time services and congregative data services by connecting concentrated or distributed users with servers based on a broadband transmission and switching technique. In implementing such B-ISDN, an ATM (asynchronous transfer mode) technique is adopted to transmit information across the user-network interface, wherein the ATM technique is a packet-based asynchronous time-division multiplexing technique and is capable of processing various kinds of services with advantages of conventional circuit-switching and packet-switching together.

A future ATM network will be required to provide tremendous by different services which have much different traffic characteristics quantitatively as well as qualitatively. The required services must satisfy stringent requirements on throughput, delay, jitter, and loss rate; and as real-time services become major services of broadband networks, the requirements for delay and jitter will be particularly strict: for real-time information is considered lost if it is not transferred within a time limit.

A number of studies have been reported on the queueing strategy which can support real-time communication services in high-speed packet switched networks. They can be classified into the work-conserving and the non-work-conserving strategy. In the network with the work-conserving service disciplines, network load fluctuation at previous nodes may distort the traffic pattern of a connection and cause an instantaneous rate increase at a certain node even when the connection satisfies the user-specified rate constraint at the entrance to the network. The burstiness of traffic in a connection usually accumulates at each hop along the connection path from a source to a destination, thereby requiring more resources for downstream nodes.

In order to redress this problem, several non-work-conserving packet service disciplines have been proposed so as to regulate the packet jitter at intermediate nodes to prevent the traffic from becoming burstier. Hierarchical round robin and stop-and-go techniques are their typical examples; divide the time axis into frames of a constant length and allocate a certain number of segmented frames to each connection. In this framing strategy, packet service is allowed only for the allocated time frame and thus can bound the delay jitter. However, it intrinsically has the coupling problem between bandwidth granularity and delay bounds, thus leading to a low bandwidth utilization. A jitter earliest-due-date and a rate-controlled static priority techniques control packet jitter on a per packet basis, but require to compute the leading time of each packet in each node and to stamp it on a header for transmission to a next node.

Figure 1:
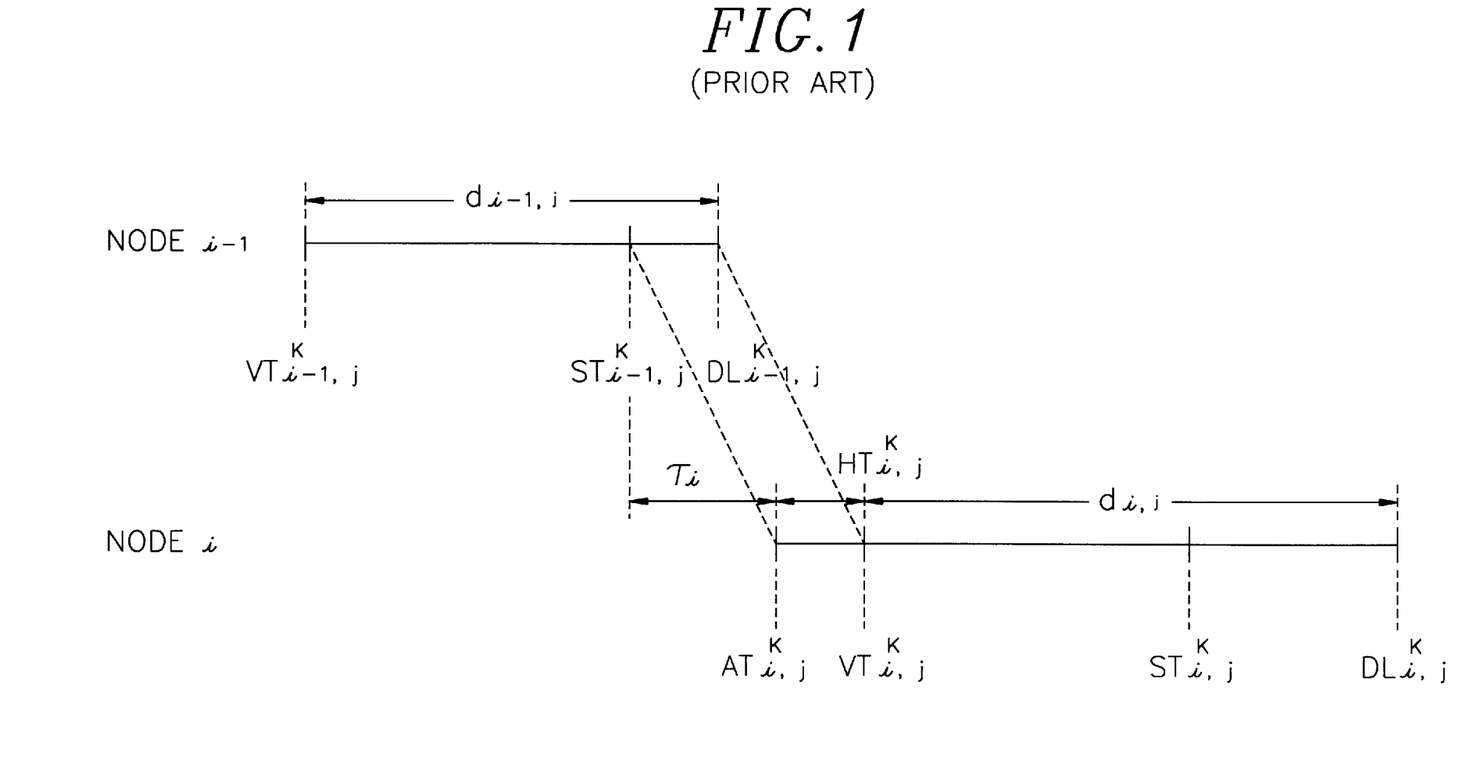
FIG. 1 illustrates the conventional jitter earliest-due-date principle.

Referring to FIG. 1, there is illustrated the conventional jitter earliest-due-date technique. $VT_{i-1,j}^{k}$ is a virtual arrival time of a kth cell at a node (i−1) of a connection j; $DL_{i-1,j}^{k}$ is a deadline of the kth cell at the node (i−1) of the connection j before which the cell must be serviced; $ST_{i-1,j}^{k}$ is a service time of the kth cell at the node (i−1) of the connection j when the cell is actually serviced to a next node of the node (i−1), that is, node i; and $d_{i-1,j}$ is a delay bound at the node (i−1) of the connection j. Further, $\tau_i$ is a propagation delay between the node (i−1) and the node i; $AT_{i,j}^{k}$ is an actual arrival time of the kth cell at the node i of the connection j; $HT_{i,j}^{k}$ is a holding time during which the kth cell is temporarily stored in a jitter controller; $DL_{i,j}^{k}$ is a deadline of the kth cell at the node i of the connection j before which the cell must be serviced; $ST_{i,j}^{k}$ is a service time of the kth cell at the node i of the connection j when the cell is actually serviced to a next node; and $d_{i,j}$ is a delay bound at the node i of the connection j. After the kth cell has been serviced at the node (i−1), it is stamped with the difference between its deadline and the service time, that is, $(DL_{i-1,j}^{k}-ST_{i-1,j}^{k})$. A jitter controller at the entrance of the node i holds the kth cell for this period $HT_{i,j}^{k}$ before the kth cell is made eligible to be scheduled, and transmits the kth cell to a scheduler at the virtual arrival time $VT_{i,j}^{k}$ of the kth cell at the node i of the connection j.

However, the existing non-work-conserving packet service disciplines are not suitable for application to ATM networks in their current forms, because they control delay jitter either by employing the framing strategy or by delivering jitter information using the packet header. The former cannot fully satisfy the diverse performance requirements of connection efficiently due to its intrinsic coupling problem, and the latter requires a header space to transmit the time stamps, which is hardly permissible in the ATM network.

SUMMARY OF THE INVENTION

It is, therefore, a primary object of the invention to provide a method capable of finding out jitter information to thereby control jitter without transmitting the jitter information from one node to another.

In accordance with the present invention, there is provided a method for transmitting jitter information in a network, wherein a connection for a call is established from a source node to a destination node through a plurality of nodes, and a frame counter is located at each of the nodes, the method comprising the steps of: (a) detecting propagation delays and corresponding mismatch delays between neighboring node pairs, delay bounds at each of the nodes, and a frame size of the connection, wherein each neighboring node pair includes an upstream node positioned toward the source node and a downstream node positioned toward the destination node, and the corresponding mismatch delay results from the mismatch in slot boundaries between an upstream node and a downstream node; (b) synchronizing and activating the frame counters, each frame counter being located at each of the nodes, based on the propagation delays and the corresponding mismatch delays between the neighboring node pairs, the delay bounds at each of the nodes, and the frame size of the connection; and (c) servicing a cell from the source node to the destination node through each node based on the value of the corresponding frame counter.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 2:
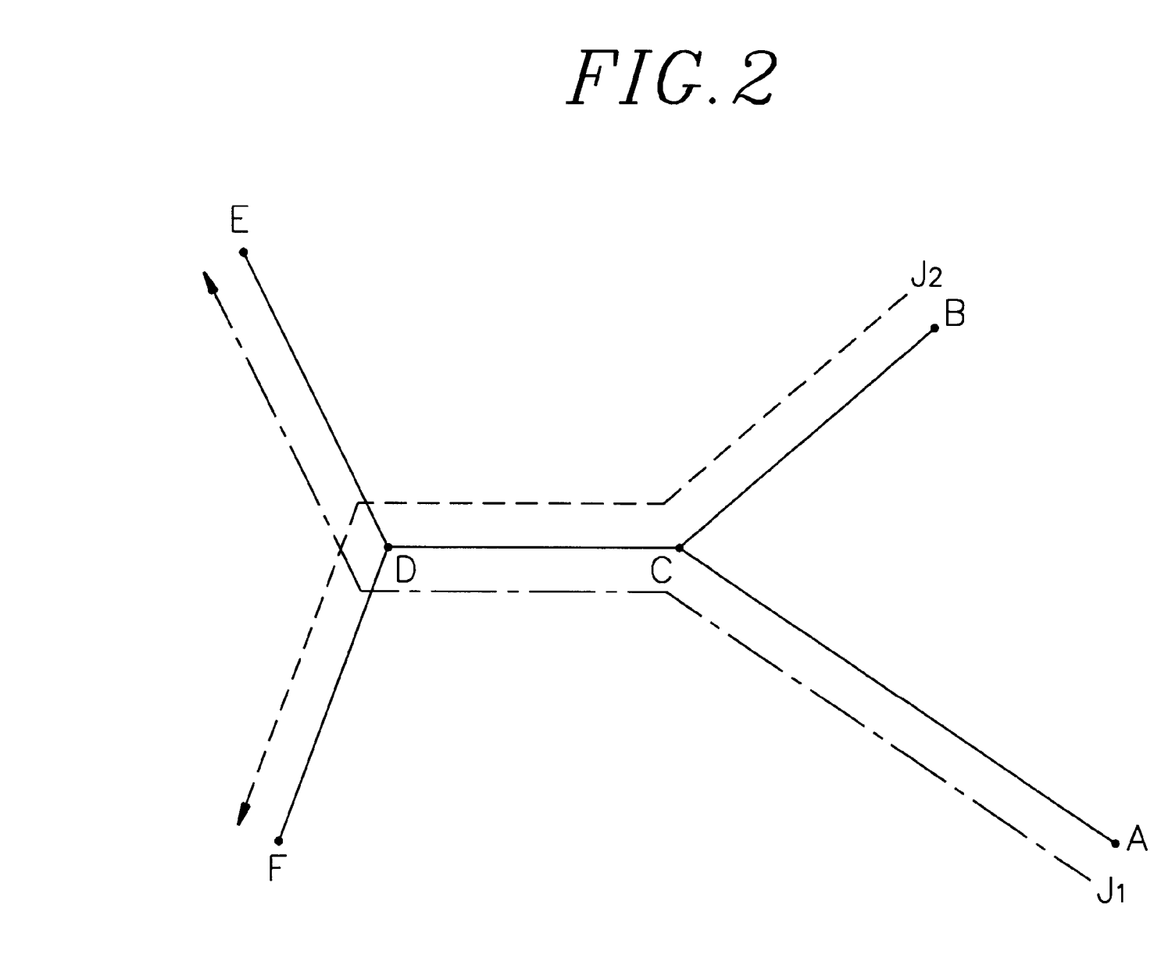
FIG. 2 demonstrates an exemplary diagram of a network which is composed of a plurality of nodes.

In a communication model of the present invention, a network is composed of a set of nodes connected by a set of links as shown in FIG. 2. Each unidirectional link allows two nodes to communicate through a bandwidth. The set of links that a packet or cell of a connection traverses in going from its source node to its destination node is called the path of the packet. The example in FIG. 2 has two connections; a connection $J_1$, following a path $P_1=\{AC, CD, DE\}$; and a connection $J_2$ following a path $P_2=\{BC, CD, DF\}$. For the link CD, the set of connections which use the link CD is $\{J_1, J_2\}$.

In accordance with the present invention, there is devised a new queueing strategy suitable for real-time communication services, which provides congestion-free communications with guaranteed throughput and almost constant end-to-end delay. The queueing strategy of the invention uses a per-session pre-synchronized(PSPS) framing strategy. Each of the frames of a connection is defined per session by a frame counter at each node and the boundaries of the frames are aligned through pre-synchronization of the frame counters in a connection set-up stage. These synchronized frame counters can efficiently control the delay-jitter without requiring header spaces for delivering the jitter information. Therefore the PSPS framing strategy can be directly applied to the ATM network, rendering an attractive solution for the transmission of time-critical information, that is, real-time communication signals such as voice, video, and circuit emulation in the ATM network.

Figure 3:
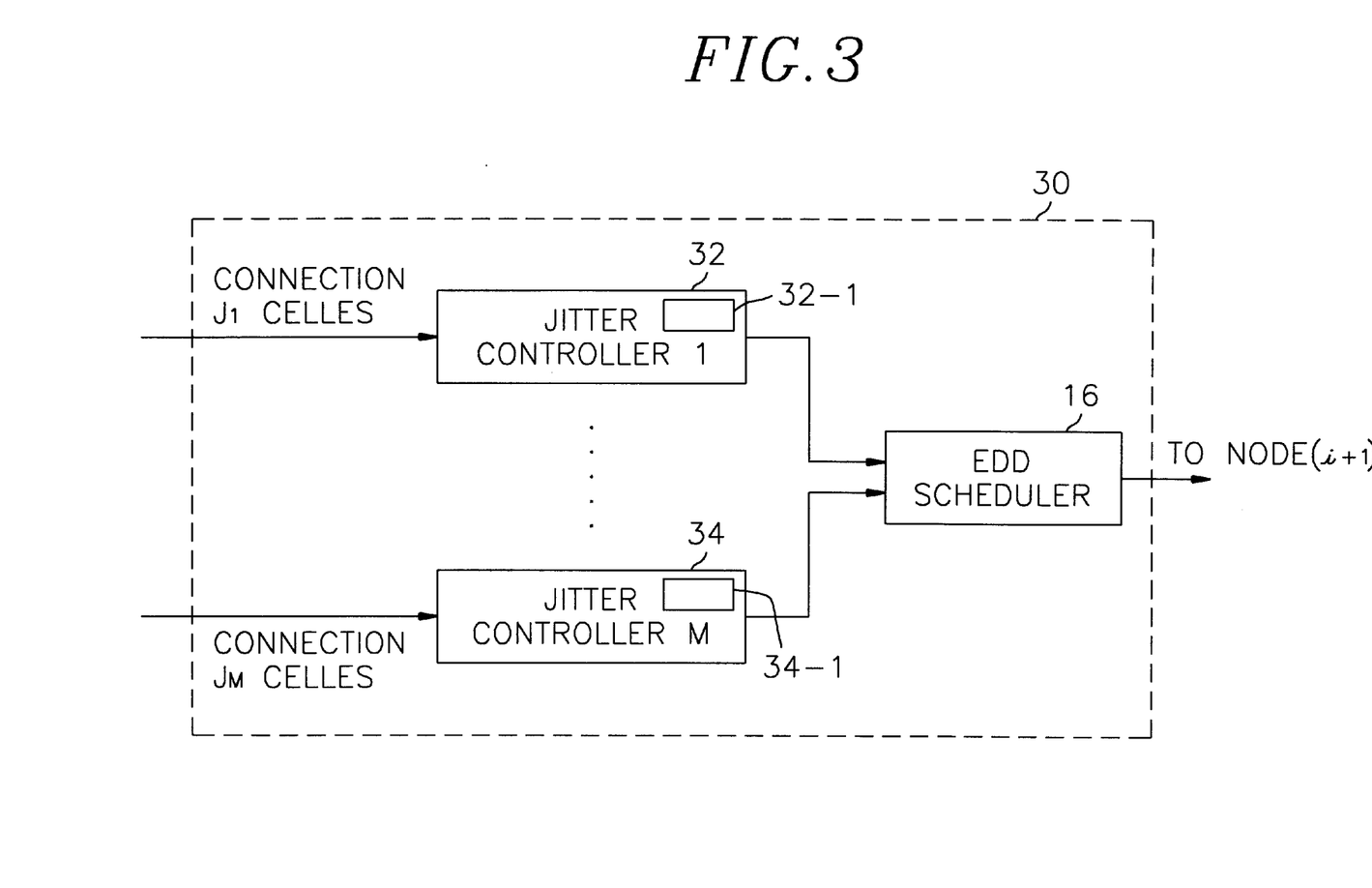
FIG. 3 shows a system arrangement for a node for the PSPS service discipline.

FIG. 3 shows a system arrangement for a node for the PSPS service discipline. The system 30 for a node i includes controllers 32 to 34 and an EDD(earliest-due-date) scheduler 36. Each of the jitter controllers 32 to 34 admits input cells belonging to a corresponding connection $J_1$ to $J_M$ among connections, holds them until the corresponding virtual arrival times, and then passes them to the scheduler 36 with their deadline information, the connections $J_1$ to $J_M$ passing through the node i and its next node (i+1). The virtual arrival time for a cell refers to an ending time of a frame that contains the cell and the deadline refers to an ending time of a delay bound for the cell measured from the virtual arrival time. The EDD scheduler 36 compares the deadlines of all cells in the scheduler and services to the node (i+1) the one that is nearest to its deadline. In accordance with the present invention, each jitter controller includes therein a pre-synchronized frame counter, e.g., 32-1 or 34-1; and the deadline information is represented by counted values from the frame counters.

For the PSPS framing strategy, frame boundaries of each neighboring node pair should be aligned so that the jitter information of the upstream node, e.g., the node i can be delivered to the downstream node, e.g., the node (i+1) effectively. The aligning procedure may be proceeded backward during setting up a connection for a call as follows. The destination node activates its frame counter and sends a count value from the frame counter to the neighboring upstream node. On receiving the value, the upstream node initializes the frame counter corresponding to the connection for the call with a value that reflects the relevant propagation delay and other factors as discussed below. The procedure repeats for each neighboring node pair until the source node becomes the neighboring upstream node of the pair.

Figure 4:
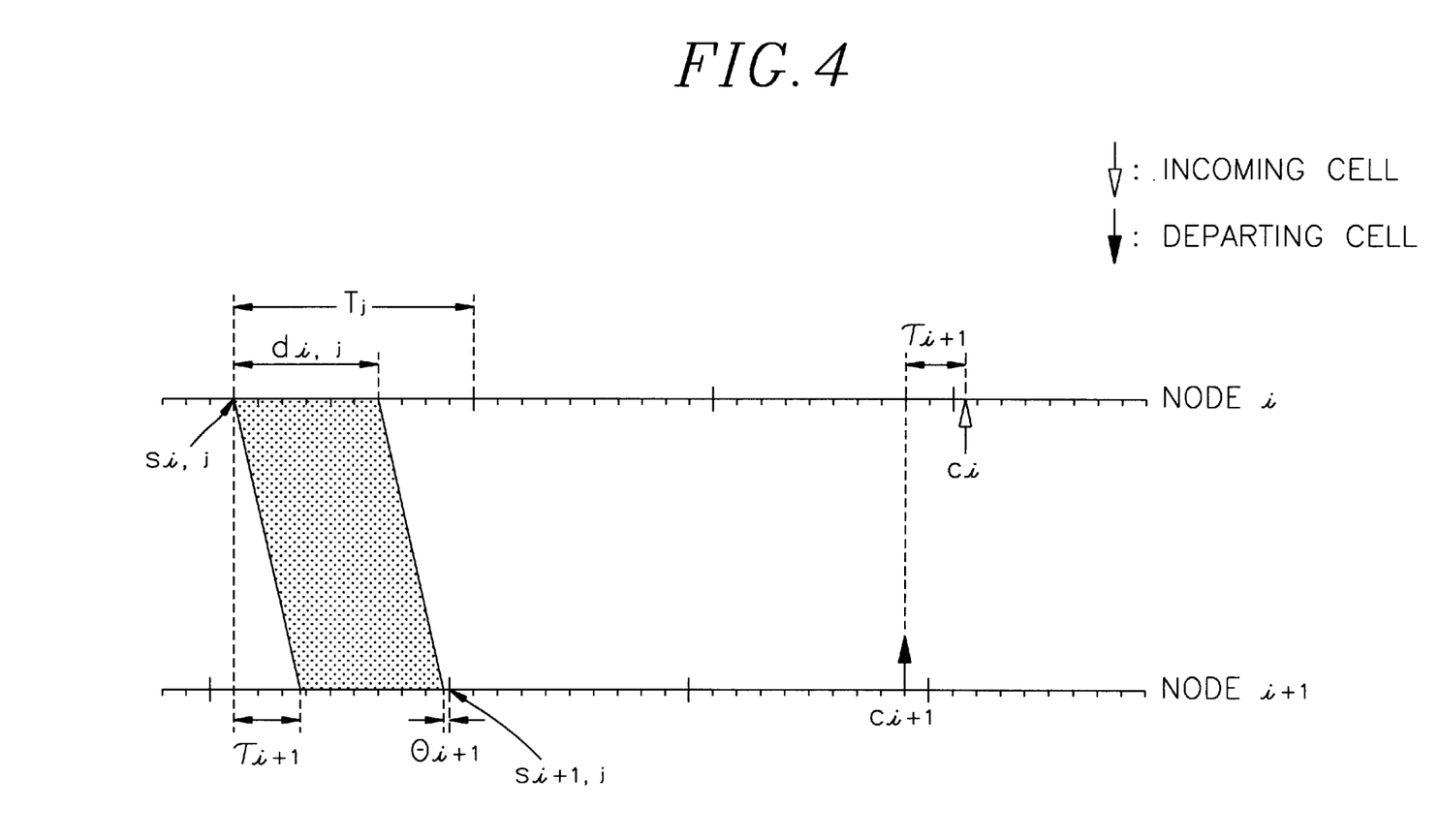
FIG. 4 provides a timing diagram for frame counter synchronization.

Referring to FIG. 4, there is shown a timing diagram for explaining frame counter pre-synchronization process. Let $s_{i,j}$ denotes a frame start time at a node i of a connection j. Then the relation $$s_{i+1,j} = s_{i,j} + d_{i,j} + \tau_{i+1} + \theta_{i+1} \qquad \text{Eq.(1)}$$

holds between two neighboring nodes i and (i+1), wherein $s_{i+1,j}$ represents a frame start time at the node (i+1) of the connection j; $d_{i,j}$ a delay bound at the node i of the connection j; $\tau_{i+1}$ a propagation delay between the node i and the node (i+1); and $\theta_{i+1}$ a corresponding mismatch delay resulting from the mismatch in slot boundaries between the node i and the node (i+1). If a cell that carries the frame counter information departs the node (i+1) when its frame counter value is $c_{i+1}$, then it will arrive at the node i at time $s_{i+1,j} + (K \cdot T_j - c_{i+1} + 1) + \tau_{i+1}$ for some integer K, wherein Tj represents a frame size of the connection j and it is assumed that one time slot elapses during one cell transmission.

This arrival time indicates that the amount of time $d_{i,j} + 2\tau_{i+1} + \theta_{i+1} - c_{i+1} + 1$ has elapsed since the frame boundary of the node i, and thus the frame counter at the node i should be initialized, at the next time slot after the arrival of the cell, to $c_i$ with the value given by, $$c_i = c_{i+1} - 1 - d_{i,j} - [2\tau_{i+1} + \theta_{i+1}] \pmod{T_j}. \qquad \text{Eq. (2)}$$

When this initialization process is completed, the frame counter counts down at the rate of time slot and is reset to the value $T_j$ as it reaches the zero value. Once the frame counters in a connection are synchronized as above at the call setup stage, each frame counter may operate independently. Hereinafter, the sum of the propagation delay between the node (i−1) and the node i and the additional delay resulting from the mismatch in slot boundaries between the node (i−1) and the node i will be denoted by ri, for the sake of convenience.

From another point of view, the frame counters are pre-synchronized such that the virtual arrival time of a cell at each node can be determined without delivering the jitter information from one node to another. To be more specific, a frame counter $C_{i,j}$ operates on condition that Eq. (3) holds, wherein the frame counter $C_{i,j}$ is located at the node i of the connection j.

$$VT_{i-1,j}^{k} + d_{i,j} + \tau_i = AT_{i,j}^{k} + C_{i,j}(AT_{i,j}^{k}) \qquad \text{Eq.(3)}$$

wherein $VT_{i-1,j}^{k}$ denotes a virtual arrival time of a kth cell at the node i of the connection j; $d_{i,j}$ a delay bound at the node i of the connection j; $\tau_{i+1}$ a propagation delay between the node i and an node (i+1); $AT_{i,j}^{k}$ an actual arrival time of the kth cell at the node i of the connection j; and $C_{i,j}(AT_{i,j}^{k})$ a counter value at $AT_{i,j}k$.

As a result, the virtual arrival time $VT_{i,j}^k$ of the kth cell at the node i of the connection j is calculated by adding the actual arrival time $AT_{i,j}^k$ of the kth cell at the node i of the connection j to the value of the frame counter $C_{i,j}$ at $AT_{i,j}^k$ because $C_{i,j}(AT_{i,j}^k$ represents a remaining time from $AT_{i,j}^k$ to $VT_{i,j}^k$.

Figure 5:
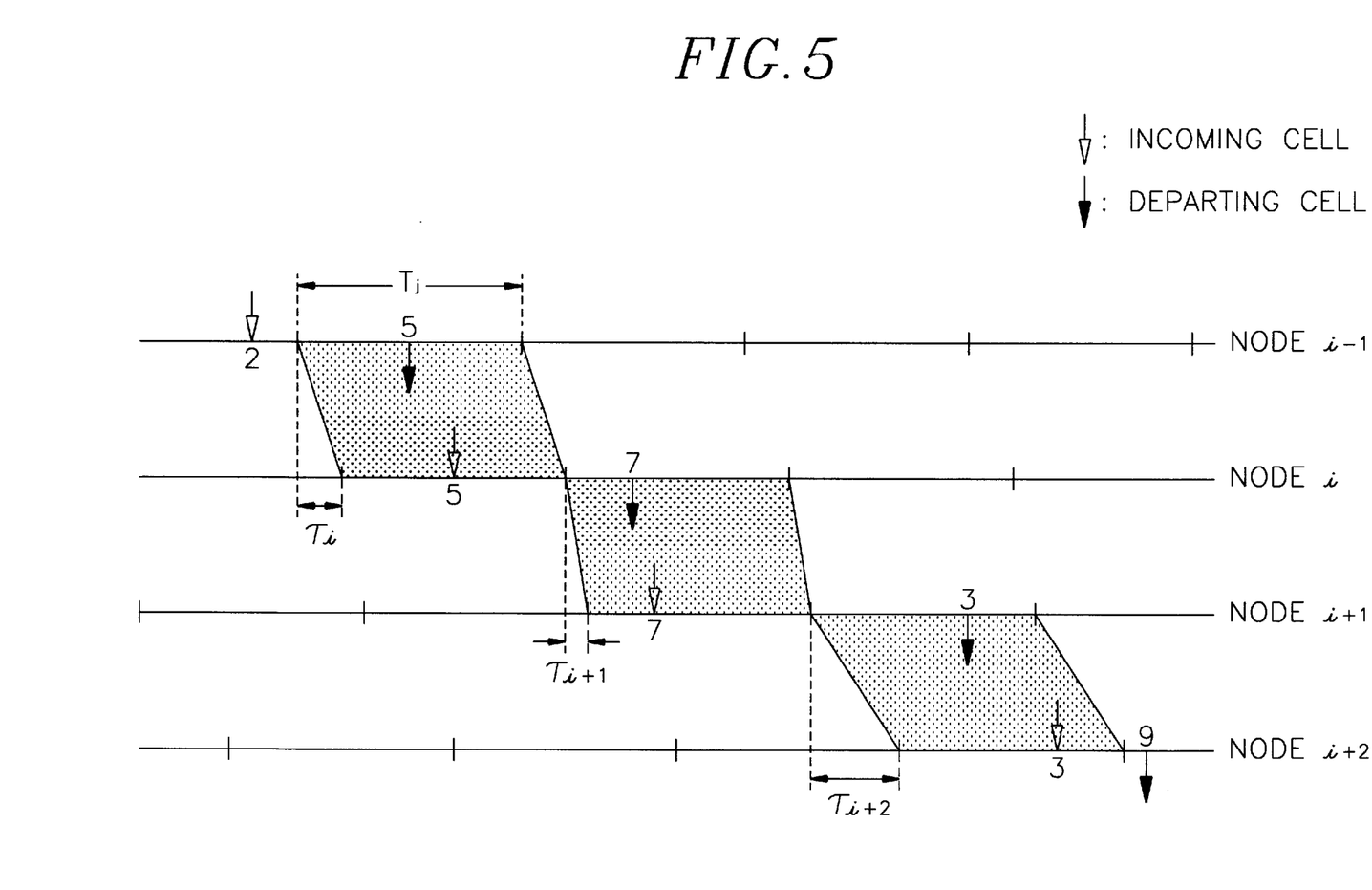
FIG. 5 represents a first embodiment of the pre-synchronization of frame counters when the delay bounds at nodes are equal to a frame size.

Referring to FIG. 5, there is illustrated a first embodiment of pre-synchronization of frame counters when delay bounds at nodes are equal to a frame size of a corresponding connection j. White arrows represent incoming cells each of which arrives at the corresponding node, and black arrows represent departing cells each of which leaves the corresponding node. If the time frame of the connection j begins at time $s_{0,j}$, a virtual arrival time $VT_{0,j}^k$ of a kth cell at a source node of the connection j is calculated as follows:

$$VT_{0,j}^k = \begin{cases} s_{0,j}, & k = 0 \\ \max\left[VT_{0,j}^{k-1} + T_j, s_{0,j} + T_j \left\lceil \frac{AT_{0,j}^k - s_{0,j}}{T_j} \right\rceil\right], & k \geq 1 \end{cases} \quad \text{Eq. (4)}$$

wherein $VT_{0,j}^{k-1}$ denotes a virtual arrival time of a (k-1)st cell at the source node of the connection j; $T_j$ the frame size of the connection j; $AT_{0,j}^k$ an actual arrival time of the kth cell at the source node of the connection j; and $\lceil \ \rceil$ an operator which rounds off its operand to a smallest integer greater than or equal to its operand. And, the virtual arrival time of the kth cell at the node i of the connection j is calculated as follows:

$$VT_{i,j}^k = VT_{i-1,j}^k + T_j + \tau_i \quad \text{Eq.(5)}$$

wherein $VT_{i,j}^k$ represents a virtual arrival time of the kth cell at the node i of the connection j; $VT_{i-1,j}^k$ a virtual arrival time of the kth cell at a node (i-1) of the connection j; $T_j$ the frame size of the connection j; and $\tau_i$ a propagation delay between the node (i-1) and the node i. When the kth cell arrives at the source node, it is held until its virtual arrival time $VT_{0,j}^k$ and is transmitted to its next node 1 during the time interval between $VT_{0,j}^k$ and $VT_{0,j}^k + T_j$.

A frame counter is assigned to each node of the connection j in FIG. 5. Each frame counter is pre-synchronized according to the afore-mentioned pre-synchronization process, is decreased by one for each time slot, and is reset to the frame size $T_j$ of the connection j when its value becomes 0. To be more specific, the frame counters are pre-synchronized by taking account of propagation delays between two neighboring nodes such that $c_{i,j}$ lags behind $C_{i-1,j}$ by as much as $\tau_i$, with $C_{i,j}$ being a frame counter located at the node i of the connection j, $C_{i-1,j}$ being a frame counter located at the node (i-1) of the connection j, and $\tau_i$ being a propagation delay between the node (i-1) and the node i; $C_{i+1,j}$ lags behind $C_{i,j}$ by as much as $\tau_{i+1}$, with $C_{i+1,j}$ being a frame counter located at a node (i+1) of the connection j and $\tau_{i+1}$ being a propagation delay between the node i and the node (i+1); and $C_{i+2,j}$ lags behind $C_{i+1,j}$ by as much as $\tau_{i+2}$, with $C_{i+2,j}$ being a frame counter located at the connection j of a node (i+2) and $\tau_{i+2}$ being a propagation delay between the node (i+1) and the node (i+2).

Assume that the kth cell arrives at the node (i-1) when the value of $C_{i-1,j}$ is 2 and departs to the node i when the value of $C_{i-1,j}$ is 5. Since the propagation delay between the node (i-1) and the node i is 2, $C_{i,j}$ lags behind $C_{i-1,j}$ as much as 2. Therefore, the kth cell which leaves the node (i-1) when the value of $C_{i-1,j}$ is 5 arrives at the node i when the value of $C_{i-1,j}$ is also 5. Then the kth cell is considered to arrive at the node i when the value of $C_{i,j}$ is 0, held for 5 time slots, and transmitted to the node (i+1).

Meanwhile, in a general framing strategy, the delay bound at each node is given by the frame size of the corresponding connection, and the frame size is the inverse of the bandwidth allocated to the corresponding connection. Accordingly, the allocation of bandwidth is coupled with the delay bound, resulting in inefficient utilization of network resources. This inefficiency can be alleviated by decoupling the delay bound allocation from the bandwidth allocation.

Figure 6:
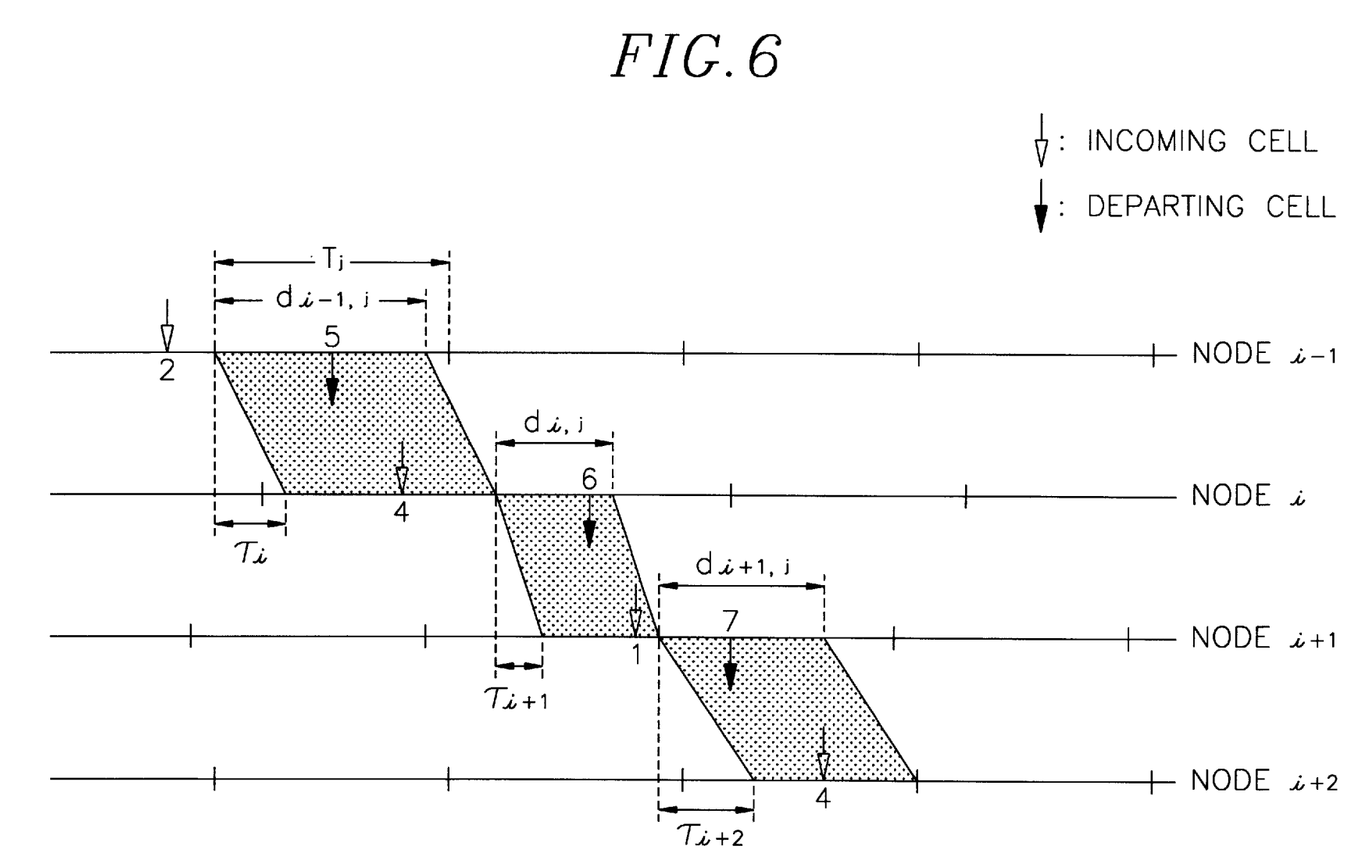
FIG. 6 depicts a second embodiment of the pre-synchronization of frame counters when the delay bounds are smaller than the frame size.

Referring to FIG. 6, there is depicted a second embodiment of pre-synchronization of frame counters when delay bounds are smaller than the frame size, which is an example of decoupling the bandwidth allocation from the delay bound. White arrows represent incoming cells each of which arrives at a node, and black arrows represent departing cells each of which leaves a node. A deadline of a kth cell at a node i of a connection j with the virtual arrival time $VT_{i,j}^k$ becomes $VT_{i,j}^k + d_{i,j}$, not $VT_{i,j}^k + T_j$, wherein the deadline of the kth cell at the node i means the time before which the kth cell must be transmitted to a node (i+1), d is a delay bound of the node i of the connection j, and $T_j$ is a frame size of the connection j. And, each frame counter located at each node of the connection j is pre-synchronized such that the cell departing a node (i-1) when the value of the frame counter located at the node (i-1) of the connection j is c arrives at the node i of the connection j to find that the value of the frame counter located at the node i of the connection j is $c-(T_j-d_{i-1,j})$, wherein $T_j$ is the frame size of the connection j and $d_{i-1,j}$ is a delay bound of the node (i-1) of the connection j.

A frame counter is assigned to each node of the connection j in FIG. 6. Each frame counter is pre-synchronized according to the afore-mentioned pre-synchronization process, is decreased by one at each time slot, and reset to the frame size when it becomes 0. To be more specific, the frame counters are synchronized by taking account of propagation delays between two neighboring nodes, delay bounds of each node of the connection j, and the frame size of the connection j such that $C_{i,j}$ lags behind $C_{i-1,j}$ by as much as $\tau_i-(T_j-d_{i-1,j})$, with $C_{i,j}$ being a frame counter located at the node i of the connection j, $C_{i-1,j}$ being a frame counter located at the node (i-1) of the connection j, $\tau_i$ being a propagation delay between an node (i-1) and the node i, $T_j$ being the frame size of the connection j, and d being a delay bound at the node (i-1) of the connection j; $C_{i+1,j}$ lags behind $C_{i,j}$ by as much as $\tau_{i+1}-(T-d_{i,j})$ with $C_{i+1,j}$ being a frame counter located at the connection j of an node (i+1), $\tau_{i+1}$ being a propagation delay between the node i and the node (i+1), and $d_{i,j}$ being a delay bound at the node i of the connection j; and $C_{i+2,j}$ lags behind $C_{i+1,j}$ by as much as $\tau_{i+2}-(T_j-d_{i+1,j})$, with $C_{i+2,j}$ being a frame counter located at a node (i+2) of the connection j, $\tau_{i+2}$ being a propagation delay between the node (i+1) and a node (i+2), and $d_{i+1,j}$ being a delay bound at the node (i+1) of the connection j.

Assume that the kth cell arrives at the node (i-1) when the value of $C_{i-j}$ is 2 and departs to the node i when the value of $C_{i-1,j}$ is 5. The delay bound of the node (i-1) is 9, and the frame size of the connection j is 10. Since the propagation delay between the node (i-1) and the node i is 3, $C_{i,j}$ lags behind $C_{i-1,j}$ by as much as $3-(10-9)=2$. Therefore, the kth cell which leave the node (i-1) when the value of $C_{i-1,j}$ is 5 arrives at the node i when the value of $C_{i,j}$ is 4. Then the kth cell is considered to arrive at the node i when the value of $C_{i,j}$ is 0, held for 4 time slots, and transmitted to the node (i+1).

Figure 7:
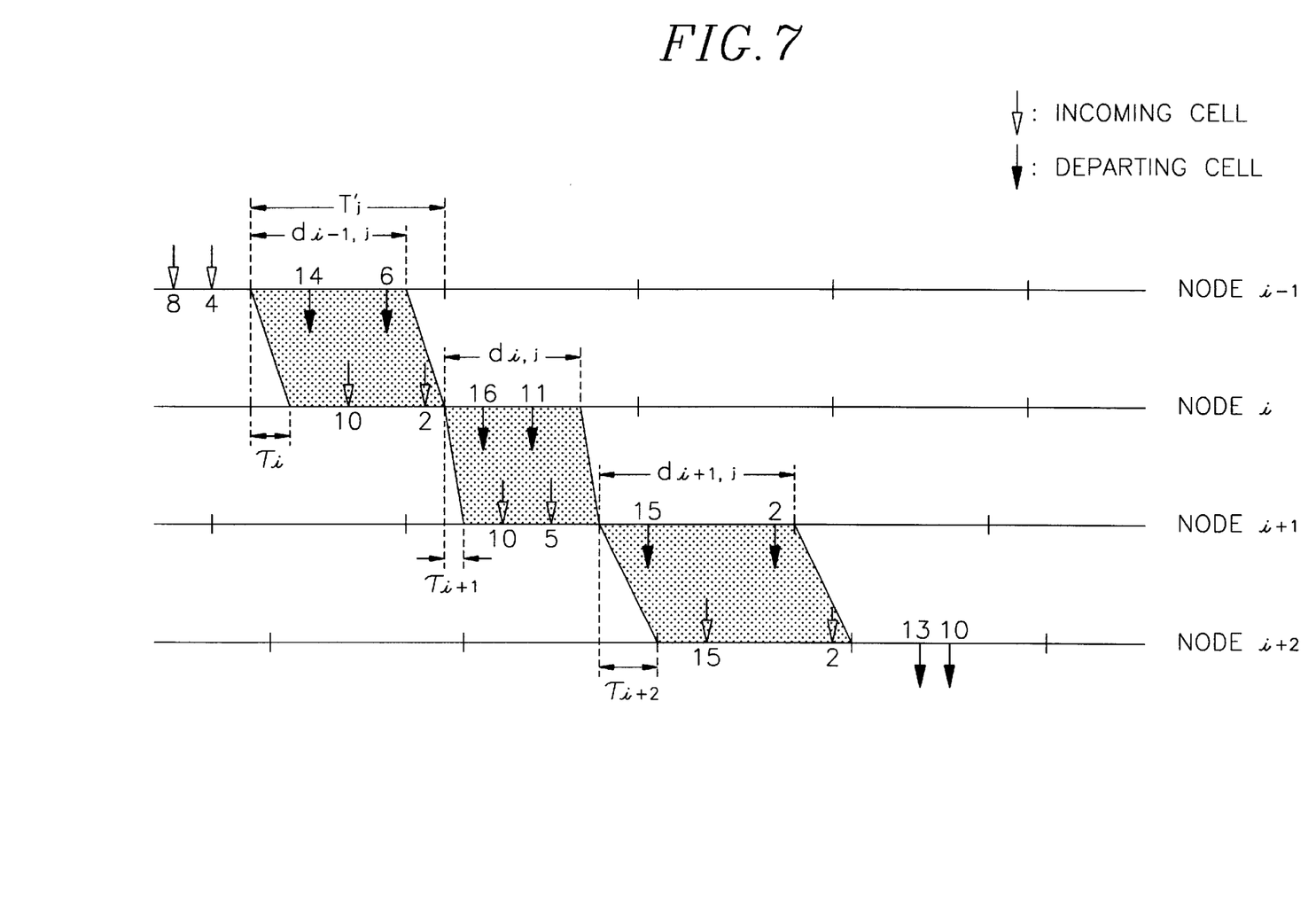
FIG. 7 describes a third embodiment of the pre-synchronization of frame counters when delay bounds are greater than the frame size.

Referring to FIG. 7, there is described a third embodiment of pre-synchronization of frame counters when delay bounds are greater than the frame size, which is another example of decoupling the bandwidth allocation from the delay bound. White arrows represent incoming cells each of which arrives at a node, and black arrows represent departing cells each of which leaves a node. A larger delay bound is permitted for the same bandwidth by servicing multiple cells within a integrated frame $T_j'$ whose size is increased to n·$T_j$, with $T_j$ being an original frame size of a connection j, n being an integer greater than 1, and the delay bound being greater than (n−1)·$T_j$ and not greater than n·$T_j$. In other words, n number of frames are integrated into one frame to thereby service n number of cells during the integrated one frame. A virtual arrival time of a kth cell at a node i of the connection j is computed in such a way that a maximum of n cells can be serviced during one frame interval $T_j'$, which can be done simply by replacing $VT_{0,j}^{k-1}$ with $VT_{i,j}^{k-n}$ in Eq. (4) and $VT_{i,j}^{k-1}$ with $VT_{i,j}^{k-n}$ in Eq. (5).

The frame counters are pre-synchronized in a similar manner as is done in the second embodiment of the present invention. That is, a frame counter is assigned to each node of the connection j in FIG. 7, and the value of n is 2. Each frame counter is pre-synchronized according to the aforementioned pre-synchronization process, is decreased by one at each time slot, and is reset to the frame size when it becomes 0. To be more specific, the frame counters are synchronized by taking account of the propagation delay between two neighboring nodes, delay bounds of each node of the connection j, and the frame size of the connection j such that $C_{i,j}$ lags behind $C_{i-1,j}$ by as much as $\tau_1-(T_j'-d_{i-1,j})$, with $C_{i,j}$ being a frame counter located at the node i of the connection j, $C_{i-1,j}$ being a frame counter located at a node (i−1) of the connection j, $\tau_i$ being a propagation delay between the node (i−1) and the node i, $T_j'$ being the frame size of the connection j, and d being a delay bound at the node (i−1) of the connection j; $C_{i+1,j}$ lags behind $C_{i,j}$ by as much as $\tau_{i+1-(Tj'}-d_{i,j})$, with $C_{i+1,j}$ being a frame counter located at a node (i+1) of the connection j, $\tau_{i+1}$ being a propagation delay between the node i and the node (i+1), and $d_{i,j}$ being a delay bound at the node i of the connection j; and $C_{i+2,j}$ lags behind $C_{i+1,j}$ by as much as $\tau_{i+2}-(T_j'-d_{i+1,j})$, with $C_{i+2,j}$ being a frame counter located at a node (i+2) of the connection j, $\tau_{i+2}$ being a propagation delay between the node (i+1) and the node (i+2), and $d_{i+1,j}$ being a delay bound at the node (i+1) of the connection j.

Assume that the kth cell arrives at the node (i−1) when the value of $C_{i-1,j}$ is 8 and a (k+1)st cell arrives at the node (i−1) when the value of $C_{i-1,j}$ is 4, and the kth cell departs to the node i when the value of $C_{i-1,j}$ is 14 and the (k+1)st cell departs to the node i when the value of $C_{i-1,j}$ is 11. The delay bound of the node (i−1) is 16, and the integrated frame size of the connection j is 20. Since the propagation delay between the node (i−1) and the node i is 4 and the delay bound at the node (i−1) of the connection j is 16, $C_{i,j}$ lags behind Ci−j by as much as 4−(20−16)=0, that is, $C_{i,j}$ is exactly synchronized with $C_{i-1,j}$. Therefore, the kth cell which leave the node (i−1) when the value of C is 14 arrives at the node i when the value of $C_{i,j}$ is 10, and the (k+1)st cell which leave the node (i−1) when the value of $C_{i-1,j}$ is 6 arrives at the node i when the value of $C_{i,j}$ is 2. Then the kth cell is considered to arrive at the node i when the value of $C_{i,j}$ is 0, held for 10 time slots, and transmitted to the node (i+1); and the (k+1)st cell is considered to arrive at the node i when the value of $C_{i,j}$ is 0, held for 2 time slots, and transmitted to the node (i+1).

In accordance with the three embodiments of the present invention described above, a generalized algorithm can be formulated to thereby extend to all possible delay bounds in the range of $0<d_{i,j}<\infty$, wherein $d_{i,j}$ is a delay bound at a node i of a connection j. Multiple cells are serviced in one frame interval and the delay bound of each node is set to an arbitrary value smaller than the frame size. Then, all the end-to-end delay requirements can be met regardless of the size of the bandwidth. In this generalized algorithm, a virtual arrival time is computed as follows:

at a source node, $$VT_{0,j}^k = \begin{cases} s_{0,j}, & k \leq 0 \\ \max\left[VT_{0,j}^{k-n} + T_j, s_{0,j} + T_j \left\lceil \frac{AT_{0,j}^k - s_{0,j}}{T_j} \right\rceil \right] & k \geq 1 \end{cases} \quad \text{Eq. (6)}$$

wherein $VT_{0,j}^k$ is a virtual arrival time of a kth cell at the source node of the connection j; $s_{0,j}$ is the time when the time frame at the source node of the connection j begins; n is the number of cells which are serviced during one frame; $VT_{0,j}^{k-n}$ is a virtual arrival time of a (k−n)th cell at the source node of the connection j, and when (k−n) is smaller than or equal to "0", $VT_{0,j}^{k-n}$ is considered to be $s_{0,j}$ though there is no (k−n)th cell; $T_j$ is a frame size of the connection j; $AT_{0,j}^k$ is an actual arrival time of the kth cell at the source node of the connection j; and $\rceil\lceil$ is an operator which rounds off its operand to a smallest integer greater than or equal to its operand; and at the other nodes, $$VT_{i,j}^k = VT_{i-1,j}^k + d_{i-1,j} + \tau_i \quad \text{Eq.(7)}$$

wherein $VT_{i,j}^k$ is the virtual arrival time of the kth cell at the node i of the connection j; $d_{i-1,j}$ is a delay bound at a node (i−1) of the connection j; and $\tau_j$ is a propagation delay between the node (i−1) and the node i.

The general algorithm may well be used in the networks having constant propagation delay, as it relies on the frame counters which are supposed to be synchronized at the call setup stage. However, it can also be applied to the networks having variable propagation delay under some restriction. In case a frame size $T_j$ of a connection j is larger than or equal to the sum of the delay bound $d_{i-1,j}$ at a node (i−1) of the connection j and the corresponding propagation delay variation $(\tau_i^{max}-\tau_i^{min})$, that is $T_j \leq d_{i-1,j}+\tau_i^{max}31\ \tau_i^{min}$, it is possible to apply the general algorithm. In this case, the definition of virtual arrival time changes to $VT_{i,j}^k = VT_{i-1,j}^k + d_{i-1,j}+\tau_i'$, wherein $\tau_i'$ $(=\tau_i^{max})$ denotes a maximum propagation delay between the node (i−1) and a node i.

Figure 8:
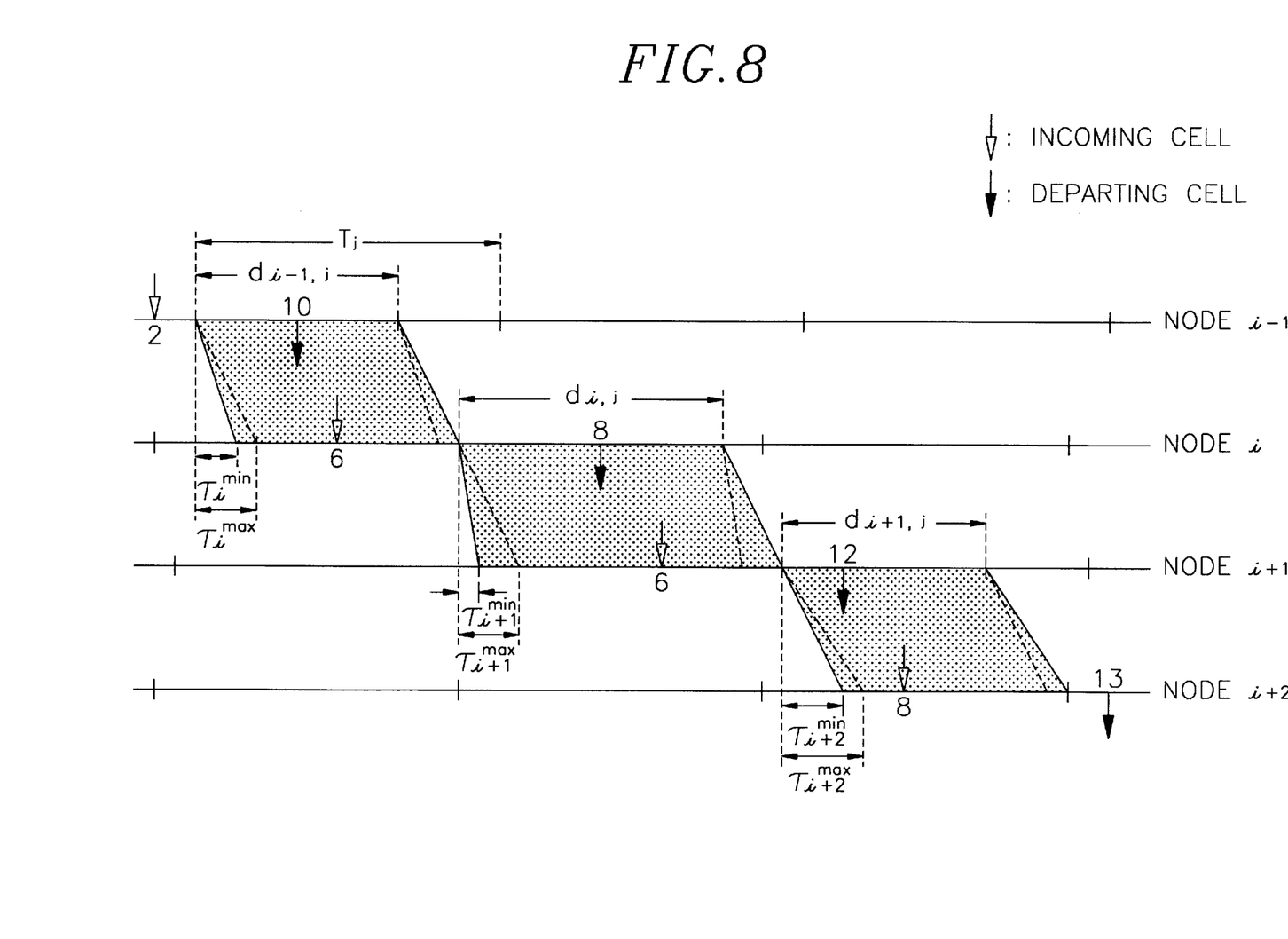
FIG. 8 offers a fourth embodiment of the pre-synchronization of frame counters for variable propagation delays.

Referring to FIG. 8, there is shown a fourth embodiment of pre-synchronization of frame counters for variable propagation delays, wherein the propagation delays are variable within predetermined ranges. Frame counter synchronization, which becomes more complicated due to propagation delay variation, can be done by employing a conventional synchronization protocol such as Network Time Protocol(see, e.g., D. Mills, "Internet time synchronization : the Network Time Protocol", IEEE Trans. commun, vol. 39, no. 10, pp. 1482–1493, Oct. 1991).

Assume that the frame size $T_j$=15, a delay bound at the node (i−1) of the connection j, $d_{i-1,j}$=10, a propagation delay variation between the node (i−1) and the node i, $\tau_i^{max}-\tau_i^{min}$= 1, and that a kth cell which arrives at the node (i−1) when the value of a frame counter $C_{i-1,j}$ located at the node (i−1) of the connection j is 2, leaves the node (i−1) when the value of $C_{i-1,j}$ is 10. Since $T_j$ is 15 and $d_{i-1,j}$ is 10, the kth cell leaves the node (i−1) earlier than the delay bound by as much as 5 time slots. Then, the kth cell arrives at the node i when the value of a frame counter $C_{i,j}$ located at the node i of the connection j is 6 if a propagation delay between the node (i−1) and the node i is minimum; and the kth cell arrives at the node i when the value of $C_{i,j}$ is 5 if the propagation delay between the node (i−1) and the node i is maximum. In FIG. 8, the kth cell experiences a minimum delay between the node (i−1) and the node i, thus, the kth cell arrives at the node i when the value of $C_{i,j}$ is 6. Then, the kth cell is considered to arrive at the node i when the value of $C_{i,j}$ is 0, held for 6 time slots, and transmitted to the node (i+1).

In accordance with the four embodiments of the present invention presented so far, the value of a frame counter has two meanings. For the cells in the jitter controller, it means the time remaining until the virtual arrival time, and for the cells in the scheduler, it means the time remaining until the deadline. For example, if a cell is serviced at a node 3 time slots earlier than its deadline, this cell arrives at its next node to find that the frame counter at the node has value 3, therefore it enters the scheduler after being held for 3 time slots in the jitter controller. From the scheduler's point of view, the cell looks as if it has experienced the maximum delay. That is, the instant the cell enters the scheduler of the current node is the same regardless of the time spent to get serviced at the previous node.

A cell is transmitted as if it were serviced at the last time slot of a frame at the node of the connection. Thus, all the cells are processed as if they were serviced at a fixed time interval, wherein the size of the time interval is same as the frame size of the connection.

The present invention can overcome the coupling problem which is inherent to the framing strategy, by employing persession frames and adjusting the frame size and the service quanta, and by synchronizing the frame counters with the offset corresponding to each delay bound, thus enabling a flexible allocation of the network resources.

While the present invention has been described with respect to certain preferred embodiments only, other modifications and variations may be made without departing from the spirit and scope of the present invention as set forth in the following claims.

What is claimed is:

1. A method for transmitting jitter information in a network, wherein a connection for a call is established from a source node to a destination node through a plurality of nodes and a frame counter is located at each of the nodes, the method comprising the steps of:

(a) detecting propagation delays and corresponding mismatch delays between neighboring node pairs, delay bounds at each of the nodes, and a frame size of the connection, wherein each neighboring node pair includes an upstream node positioned toward the source node and a downstream node positioned toward the destination node and the corresponding mismatch delay results from the mismatch in time slot boundaries between an upstream node and a downstream node;

(b) synchronizing and activating the frame counters, each frame counter being located at a corresponding node, based on the propagation delays and the corresponding mismatch delays between the neighboring node pairs, the delay bounds at each of the nodes, and the frame size of the connection; and (c) servicing a cell from the source node to the destination node through each node based on the value of the corresponding frame counter.

2. The method as recited in claim 1, wherein the step (b) includes the steps of:

(b1) initializing the frame counters based on the propagation delays between the neighboring node pairs and the delay bounds at each of the nodes of the connection;

(b2) decreasing the values of the frame counters by one for each time slot and resetting a counter whose value becomes "0" to the frame size, wherein one frame of the connection is made up of a multiplicity of time slots, both arrival of the cell at a node and departing of the cell from the node are completed within one time slot; and (b3) repeating the step (b2) until the cell arrives at the destination node.

3. The method as recited in claim 2, wherein:

if all the delay bounds at each of the nodes of the connection are smaller than or equal to the frame size of the connection, the frame size of the connection is T to thereby service one cell during T; and if a delay bound at a node of the connection is greater than (n−1)·T and not greater than n·T, the frame size of the connection is increased to n·T by integrating n number of frames into one frame to thereby service n number of cells during n·T, n being an integer greater than 1.

4. The method as recited in claim 3, wherein:

if a propagation delay between a neighboring node pair is fixed, the frame counters are synchronized such that a cell, departing an upstream node of the neighboring node pair when the value of the frame counter located at the upstream node is c; arrives at its downstream node to find that the value of the frame counter located at the downstream node is c−(T−d), wherein d is a delay bound at the upstream node; and if the propagation delay between a neighboring node pair is variable within a predetermined range and the frame size of the connection is larger than or equal to the sum of a delay bound at an upstream node of the neighboring node pair and the difference between a maximum propagation delay between the upstream node and its downstream node and a minimum delay between the upstream node and its downstream node, the frame counters are synchronized by applying a network time protocol.

5. The method as recited in claim 4, wherein the cell is serviced at a node by holding the cell until a virtual arrival time of the cell at the node, when the value of the frame counter located at the node becomes 0 and then transmitting the cell to its downstream node within a delay bound at the node.

6. The method as recited in claim 5, wherein the virtual arrival time of the cell at the node of the connection is defined as:

at the source node, $$VT_{0,j}^k = \begin{cases} s_{0,j}, & k \leq 0 \\ \max\left[VT_{0,j}^{k-n} + T_j, s_{0,j} + T_j \left\lceil \dfrac{AT_{0,j}^k - s_{0,j}}{T_j} \right\rceil \right] & k \geq 1, \end{cases}$$

wherein $VT_{0,j}^k$ is a virtual arrival time of a kth cell at the source node of the connection j; $s_{0,j}$ is the time when the frame of the connection j begins; n is the number of cells serviced during one frame; $VT_{0,j}^{k-n}$ is a virtual arrival time of a (k−n)th cell at the source node of the connection j, and when (k−n) is smaller than or equal to "0", $VT_{0,j}^{k-n}$ is considered to be $s_{0,j}$ although there is no (k−n)th cell; $AT_{0,j}^k$ is an actual arrival time of the kth cell at the source node of the connection j; and $\lceil \ \rceil$ is an operator that rounds off an operand to a smallest integer larger than or equal to the operand, j being an integer index of the connection, and k being an integer index of the cell; and at a node i, $$VT_{i,j}^k = VT_{i-1,j}^k + d_{i-1,j} + \tau_i + \theta_i,$$

if the propagation delay between two neighboring nodes is fixed wherein $VT_{i,j}^k$ is a virtual arrival time of a kth cell at the node i of the connection j; $VT_{i-1,j}^k$ is a virtual arrival time of the kth cell at a node (i−1) of the connection j; $d_{i-1,j}$ is a delay bound at the node (i−1) of the connection j; $\tau_i$ is a propagation delay between the node (i−1) and the node i; and $\theta_i$, denotes a corresponding mismatch delay between the node (i−1) and the node i, i being an integer index of the node, j being an integer index of the connection, and k being an integer index of the cell; and $$VT_{i,j}^k = VT_{i-1,j}^k + d_{i-1,j} + \tau_i' + \theta_i,$$

if the propagation delay between two neighboring nodes is variable within a predetermined range wherein $\tau_i'$ is a maximum propagation delay between the node (i−1) and the node i.

7. The method as recited in claim 6, wherein the virtual arrival time of the cell at the node i of the connection j is calculated by adding the actual arrival time of the cell at the node i of the connection j to the value of the frame counter at the actual arrival time of the cell at the node i of the connection j.

8. A method for queueing a cell from a first node to a second node in a network, the first and the second nodes having a first and a second counters, respectively, the method comprising the steps of:
(a) pre-synchronizing the counters based on a propagation delay between the nodes and a delay bound of the first node, each counter counting down values by one from a value preset by a pre-synchronizing process to 1, then being reset to M and repeatedly counting down by one from M to 1, M being a integer greater than 1, and the delay bound corresponding to a P number of counted values, P being equal to or smaller than M, wherein the counters are pre-synchronized by the pre-synchronizing process in such a manner that a counted value of the first counter at a departing time of the cell from the first node coincides with a sum of (M-P) and a counted value of the second counter at an arrival time of the cell at the second node;
(b) upon arrival of the cell at the first node, holding the cell thereat until the first counter counts down to 1 and is reset to M; and
(c) transmitting the cell from the first node to the second node before the counted value of the first counter either reaches (M-P) if P is smaller than M or is reset to M if P is equal to M.

9. The method as recited in claim 8, wherein each counter maintains a counted value for a predetermined time interval.

10. The method as recited in claim 9, wherein departing of the cell from a node and arrival of the cell at the node are completed within the predetermined time interval.

11. The method as recited in claim 10, wherein the departing and the arrival of the cell is made while the counter at the node holds one counted value.

12. A method for scheduling a plurality of cells of a call via a connection made of a multiplicity of nodes which include a source node and a destination node, each of the nodes of the connection having a frame counter, the method comprising the steps of:
(a) determining a delay bound for each node and a frame size of the call, wherein the call is divided into a plurality of frames at each node, each of the frames including an M number of time slots, M being a positive integer, each of the time slots being of a preset time interval;
(b) detecting a propagation delay between two nodes of each neighboring node pair, each neighboring node pair including an upstream node positioned toward the source node and a downstream node located toward the destination node;
(c) pre-synchronizing the frame counters of the nodes based on the propagation delay for each neighboring node pair and a delay bound of the upstream node of each neighboring node pair, the delay bound of the upstream node corresponding to P number of time slots, P being a positive integer not greater than M, a frame counter for a node counting down the time slots of each frame for the node, wherein the counters for each neighboring node pair are pre-synchronized such that a counted value of the upstream node for a cell departing therefrom is equal to a sum of (M-P) and a counted value of the downstream node at the time of arrival of the cell thereat;
(d) upon arrival of each cell at an upstream node of a neighboring node pair including the source node, holding each cell until the end of a frame where said each cell arrives;
(e) transmitting each cell from the upstream node to its corresponding downstream node before the counted value of the upstream node in step (d) either reaches (M-P) if P is smaller than M or is reset to M if P is equal to M; and
(f) repeating said steps (d) and (e) with respect to each of the remaining neighboring node pairs until each cell reaches the destination node.

13. The method as recited in claim 12, wherein boundaries of time slots in an upstream node are aligned with those of time slots in its corresponding downstream node.

14. The method as recited in claim 13, wherein said propagation delay detecting step (b) further includes the step of (b1) detecting a mismatch delay between the upstream and the downstream nodes of each neighboring node pair, the mismatch delay corresponding to the absolute difference between the amount of the propagation delay of the upstream node and a product of (n+1) by the reset time interval of a time slot when the amount of the propagation delay is greater than n times the preset time interval but not greater than (n+1) times the preset time interval, n being a positive integer.

15. The method as recited in claim 14, wherein the counters of the upstream and the downstream nodes for each neighboring pair are pre-synchronized such that a counted value of the upstream node $c_i$ and that of a downstream node $c_{i+1}$ at an instant are defined as:

$$c_i = c_{i+1} - 1 - d_i - \lceil 2\tau_{i+1}\theta_{i+1} \rceil \pmod{M}$$

wherein $d_i$ represent a delay bound of the upstream node; $\tau_{i+1}$ the propagation delay between the upstream and the downstream nodes; and $\theta_{i+1}$ the mismatch delay between the upstream and the downstream nodes.

* * * * *